United States Patent Office 3,825,496
Patented July 23, 1974

3,825,496
ORGANIC COMPOSITIONS CONTAINING SYNERGISTIC ANTIOXIDANT MIXTURES
Milton Braid, Westmont, N.J., assignor to Mobil Oil Corporation, New York, N.Y.
No Drawing. Filed May 18, 1973, Ser. No. 361,725
Int. Cl. C10m 1/38
U.S. Cl. 252—48.2                    18 Claims

ABSTRACT OF THE DISCLOSURE

Organic compositions, normally susceptible to oxidative deterioration, containing, in an amount sufficient to increase oxidation resistance, a synergistic mixture of 1-n-butoxy-1-(1-naphthoxy) ethane and a co-antioxidant selected from the group consisting of t-nonylpolysulfide, phenylthiobenzoquinone and dioctyldiphenylamine.

BACKGROUND OF THE INVENTION

1. Field of the Invention

This invention relates to organic compositions, and, in one of its aspects, relates more particularly to organic compositions such as lubricating oils, greases, liquid hydrocarbon fuels, plastic materials and other organic compositions normally susceptible to oxidative deterioration.

2. Description of the Prior Art

The prior art has long recognized that organic compositions such as lubricating oils (including mineral oil-based and synthetic oil-based compositions), liquid hydrocarbon fuels, plastic materials and other organic compositions, tend to undergo oxidative deterioration in storage and in use, particularly when subjected to heat and oxidizing conditions. The oxidation products thus formed are acidic in nature and exert a corrosive effect on metal surfaces with which they come into contact. In many instances oxidation also causes an increase in viscosity, thereby changing the character of the organic composition of the oil, grease or fuel. In this respect, many plastic materials are also susceptible to oxidation and can undergo color change, softening and also hardening by polymerization, cross-linking, embrittlement, cracking, crazing, reduced tensile strength, and loss of electrical properties. Such changes in character make the plastics less saleable from an aesthetic standpoint, particularly when the plastics are used as surface coatings or the packaging, and less desirable for other applications. As used herein, the term "plastics" is used broadly to include resins.

Various polymeric materials, including particularly those produced by polymerization of a polymerizable mixture containing at least one olefinic hydrocarbon, have in recent years become important in the manufacture of many useful articles. Such articles are generally manufactured and often used under conditions in which there is a tendency for the polymers to become oxidized. Particularly when those conditions include an elevated temperature, such as those employed to facilitate extrusion, molding or rolling of polymeric materials into useful configurations or those encountered in uses such as electrical insulation, the polymeric material usually undergoes oxidative degradation, which customarily results in an undesirable reduction of the tensile strength, flexibility or other advantageous properties of the polymeric material. This is particularly evidenced by high-impact polystyrenes, which are formed by copolymerizing a rubbery material, such as a natural or a synthetic rubber.

Various antioxidants and stabilizers have been incorporated in such polystyrenes in the past to inhibit such oxidative degradation. Many of such additives have been insufficiently effective, while many others have caused undesirable side effects, such as excessive degradation of the color of the polymeric material and excessive change in the melt index (M.I.).

Still other materials are susceptible to oxidation, including foodstuffs, edible oils, soaps, waxes, cosmetics, essential oils and perfume bases.

Of particular significance, is the ability to increase oxidation resistance of lubricating media which may comprise liquid hydrocarbon oils, in the form of either a mineral oil or a synthetic oil, or in the form of a grease in which any of the aforementioned oils are employed as a vehicle. In general, mineral oils, employed as the lubricant, or grease vehicle, may be of any suitable lubricating viscosity range, as, for example, from about 45 SSU at 100° F. to about 6,000 SSU at 100° F., and, preferably, from about 50 to about 250 SSU at 210° F. These oils may have viscosity indexes varying from below zero to about 100 or higher. Viscosity indexes from about 70 to about 95 are preferred. The average molecular weights of these oils may range from about 250 to about 800. Where the lubricant is to be employed in the form of a grease, the lubricating oil is generally employed in an amount sufficient to balance the total grease composition, after accounting for the desired quantity of the thickening agent, and other additive components to be included in the grease formulation.

In instances where synthetic oils, or synthetic oils empolyed as the vehicle for the grease, are desired in preference to mineral oils, or in combination therewith, various compounds of this type may be successfully utilized. Typical synthetic vehicles include polyisobutylene, polybutenes, hydrogenated polydecenes, polypropylene glycol, polyethylene glycol, trimethylol propane esters, neopentyl and pentaerythritol esters, di(2-ethyl hexyl) sebacate, di(2-ethyl hexyl) adipate, di(butyl phthalate, fluorocarbons, silicate esters, silanes, esters of phosphorous-containing acids, liquid ureas, ferrocene derivatives, hydrogenated mineral oils, chain-type polyphenyls, siloxanes and silicones (polysiloxanes), alkyl-substituted diphenyl ethers typified by a butyl-substituted bis (p-phenoxy phenyl) ether, phenoxy phenylethers, etc.

Of still further significance, for the purpose of increasing oxidative resistance, is the treatment of petroleum distillate fuel oils having an initial boiling point from about 75° F. to about 135° F. and an end boiling point from about 250° F. to about 750° F. It should be noted, in this respect, that the term "distillate fuel oils" is not intended to be restricted to straight-run distillate fractions. These distillate fuel oils can be straight-run distillate fuel oils, catalytically or thermally cracked (including hydrocracked) distillate fuel oils, or mixtures of straight-run distillate fuel oils, naphthas and the like, with cracked distillate stocks. Moreover, such fuel oils can be treated in accordance with well-known commercial methods, such as acid or caustic treatment, hydrogenation, solvent-refining, clay treatment and the like.

The distillate fuel oils are characterized by their relatively low viscosity, pour point and the like. The principal property which characterizes these hydrocarbons, however, is their distillation range. As hereinbefore indicated, this range will lie between about 75° F. and about 750° F. Obviously, the distillation range of each individual fuel oil will cover a narrower boiling range, falling nevertheless within the above-specified limits. Likewise, each fuel oil will boil substantially, continuously throughout its distillation range.

Particularly contemplated among the fuel oils are Nos. 1, 2 and 3 fuel oils, used in heating and as diesel fuel oils, gasoline, turbine oil and jet combustion fuels. The domestic fuel oils generally conform to the specifications set forth in ASTM Specification D396–48T. Specifications for diesel fuels are defined in ASTM Specification D975–

48T. Typical jet fuels are defined in Military Specification MIL–F–5624B.

SUMMARY OF THE INVENTION

It has now been found that resistance to oxidative deterioration of organic compositions typically illustrated by those hereinbefore described, can be increased by incorporating in such compositions, a synergistic mixture of 1-n-butoxy-1-(1-naphthoxy) ethane and, a co-antioxidant selected from the group consisting of t-nonylpolysulfide, phenylthiobenzoquinone and dioctyldiphenylamine.

Insofar as the antioxidant 1-n-butoxy-1-(1-naphthoxy) ethane is concerned, this compound is, in general, prepared as follows:

To a solution of 144.2 grams (1 mole) of 1-naphthol in 200 ml. of benzene heated at 85–90° C. there are added, while stirring, 125 grams (1.25 mole) of n-butyl vinyl ether. The addition is completed in 0.5 hour, and heating is continued for one additional hour. The reaction mixture is washed with a 20% aqueous sodium hydroxide solution. The organic part is washed with water, dried and distilled to remove benzene and unreacted ether. The residue, 171 grams (70%), of 1-n-butoxy-1-(1-naphthoxy) ethane is a clear mobile liquid. Analysis of the liquid is indicated by the following: Calculated for $C_{16}H_{20}O_2$: C, 78.6%; H, 8.23%. Found: C, 78.4%; H, 8.26%.

The infrared spectrum of this mixed acetal is consistent with the proposed structure and is substantially free of phenolic hydroxy group absorptions. The preparation of the aforementioned antioxidant, 1 - n-butoxy-1-(1-naphthoxy) ethane, is described in U.S. Pat. 3,497,181. The co-antioxidants, t-nonylpolysulfide, phenylthiobenzoquinone and dioctyldiphenylamine are commercially available materials.

Of particular importance, for the purpose of increasing oxidation resistance of organic compounds, is the synergistic effect of the aforementioned 1-n-butoxy-1-(1-naphthoxy) ethane in combination with either t-nonylpolysulfide, phenylthiobenzoquinone or dioctyldiphenylamine as co-antioxidants. As hereinafter described, even though component 1 - n-butoxy-1-(1-naphthoxy)ethane and co-antioxidants to-nonylpolysulfide, phenylthiobenzoquinone and dioctyldiphenylamine are found, individually, to impart oxidation resistance to organic compounds, the combination of 1-n-butoxy-1-(1-naphthoxy) ethane with any of the aforementioned co-antioxidants, in a total amount no greater than that employed individually for each component, exhibits a synergistic effect, by imparting a markedly increased benefit as far as oxidation resistance is concerned, greater than that of the aforementioned components, individually, even though the total weight of the combination does not exceed that of the 1-n-butoxy-1-(1-naphthoxy)ethane component and co-antioxidants t-nonylpolysulfide, phenylthiobenzoquinone and dioctyldiphenylamine, individually. The term phenylthiobenzoquinone is intended to include 1,2 or 1,4-phenylthiobenzoquinone Insofar as the 1-n-butoxy-1-(1-naphthoxy) ethane component and the aforementioned co-antioxidants t-nonylpolysulfide, phenylthiobenzoquinone or dioctyldiphenylamine are concerned, these two components are found to be synergistic in all proportions. For most applications, component 1 - n-butoxy-1-(1-naphthoxy)ethane and co-antioxidants t-noylpolysulfide, phenylthiobenzoquinone or dioctyldiphenylamine are generally employed in a mol ratio from about 1:10 to about 10:1, and preferably in a mol ratio from about 1:4 to about 4:1. In general, the synergistic mixture of the 1 - n-butoxy-1-(1-naphthoxy) ethane component in combination with co-antioxidants t-nonylpolysulfide, phenylthiobenzoquinone or dioctyldiphenylamine, may be incorporated in the organic composition in any amount which is sufficient to increase oxidation resistance. For most applications, the synergistic mixture is employed in an amount from about .01 to about 20% and, preferably, in an amount from about 0.05 to about 5%, by weight, of the total weight of the organic composition.

DESCRIPTION OF SPECIFIC EMBODIMENTS

In order to demonstrate the improvement in oxidation-resistance properties realized by employing the above-described novel synergistic mixtures in organic compositions, compared with that realized by employing the antioxidant components of the synergistic mixture, individually, comparative data were obtained as shown in the examples of the following table.

The data were obtained by means of an antioxidant test, as described in the aforementioned U.S. Pat. 3,497,181. In general, in carrying out this test, the antioxidant, or anti-oxidant synergistic mixture, is added to a solvent-refined mineral lubricating oil. The oil is then heated to 163° C. and dry air at a rate of 10 pounds per hour is passed through it in the presence of iron, copper, aluminum and lead. After 40 hours, the neutralization number (NN) for each oil composition is obtained according to ASTM Method D–741–1. The effectiveness of the antioxidants is revealed by a comparison of the control of acids (change in neutralization number) with the antioxidant-free oil. The oil employed in accordance with the tests results shown in the following table comprise a solvent-refined mineral lubricating oil, having a 128/132 SSU viscosity at 100° F. and a 390° F. minimum flash point. In the data of the table all percentages are expressed in weight percent.

TABLE

| Example | Lubricant formulation | NN increase |
|---|---|---|
| 1 | Base lubricant | 21.5 |
| 2 | Base lubricant plus 1-b-butoxy-1-1-(naphthoxy) ethane (1%). | 1.15 |
| 3 | Base lubricant plus t-nonylpolysulfide (1%) | 1.4 |
| 4 | Base lubricant plus 1-n-butoxy-1-(1-naphthoxy) ethane (0.5%) and t-nonylpolysulfide (0.5%). | 0.58 |
| 5 | Base lubricant plus phenylthiobenzoquinone (1%). | 1.08 |
| 6 | Base lubricant plus 1-n-butoxy-1-(1-naphthoxy) ethane (0.5%) and phenylthiobenzoquinone (0.5%). | 0.49 |
| 7 | Base lubricant plus dioctyldiphenylamine (1%). | 21.05 |
| 8 | Base lubricant plus 1-n-butoxy-1-(1-naphthoxy) ethane (0.5%) and dioctyldiphenylamine (0.5%). | 0.88 |

As will be seen from the foregoing table, a true synergistic effect is realized, as shown by the NN increase, employing a synergistic mixture of 1-n-butoxy-1-(1-naphthoxy) ethane in combination with any of the aforementioned co-antioxidants t-nonylpolysulfide, phenylthiobenzoquinone or dioctyldiphenylamine. Thus, the NN increase as shown in Example 3 is only 0.58 when the combination of antioxidant 1-n-butoxy-1-(1-naphthoxy) ethane and co-antioxidant t-nonylpolysulfide are employed as a mixture in a total amount not exceeding either that of antioxidant 1-n-butoxy-1-(1-naphthoxy) ethane alone or antioxidant t-nonylpolysulfide alone. The same synergistic effect is demonstrated by the NN increase of only 0.49 in Example 6 as compared with the same amount of antioxidant 1-n-butoxy-1-(1-naphthoxy) ethane or co-antioxidant phenylthiobenzoquinone. Finally, an NN increase of only 0.88 is realized in employing the synergistic mixture of antioxidant 1-n-butoxy-1-(1-naphthoxy) ethane in combination with co-antioxidant dioctyldiphenylamine as compared with employing the same amount of either antioxidant 1-n-butoxy-1-(1-naphthoxy) ethane alone, or co-antioxidant dioctyldiphenylamine alone.

While this invention has been described with reference to preferred compositions and components therefor, it will be understood, by those skilled in the art, that departure from the preferred embodiments can be effectively made and are within the scope of the specification.

I claim:

1. An organic composition comprising major amounts of a substance selected from the group consisting of mineral oils, synthetic lubricating oils, greases and liquid hydrocarbon fuels containing in an amount sufficient to increase oxidation resistance, a synergistic mixture of 1-n-butoxy-1-(1-naphthoxy) ethane and a co-antioxidant selected from the group consisting of t-nonylpolysulfide and phenylthiobenzoquinone.

2. A composition as defined in Claim 1 wherein said co-antioxidant is t-nonylpolysulfide.

3. A composition as defined in Claim 1 wherein said co-antioxidant is phenylthiobenzoquinone.

4. A composition as defined in Claim 1 wherein said composition comprises a mineral oil-based composition.

5. A composition as defined in Claim 1 wherein said composition comprises a synthetic oil-based composition.

6. A composition as defined in Claim 1 wherein said composition comprises a liquid hydrocarbon fuel.

7. A composition as defined in Claim 1 wherein said composition comprises an oil of lubricating viscosity in the range from about 45 SSU at 100° F. to about 6000 SSU at 100° F.

8. A composition as defined in Claim 1 wherein said composition comprises an oil of lubricating viscosity in the range from about 50 SSU at 210° F. to about 250 SSU at 210° F.

9. A composition as defined in Claim 1 wherein said composition comprises a grease.

10. A composition as defined in Claim 1 wherein 1-n-butoxy-1-(1-naphthoxy) ethane and co-antioxidant are present in a mol ratio of from about 1:10 to about 10:1.

11. A composition as defined in Claim 1 wherein 1-n-butoxy-1-(1-naphthoxy) ethane and the co-antioxidant are present in a mol ratio of from about 1:4 to about 4:1.

12. A composition as defined in Claim 1 wherein said synergistic mixture is present in an amount from about .01 to about 20%, by weight, of the total weight of the composition.

13. A composition as defined in Claim 1 wherein said synergistic mixture is present in an amount from about 0.05 to about 5%, by weight, of the total weight of the composition.

14. A synergistic mixture of antioxidant amount of 1-n-butoxy-1-(1-naphthoxy) ethane and, a co-antioxidant amount or a member selected from the group consisting of t-nonylpolysulfide and phenylthiobenzoquinone.

15. A synergistic mixture as defined in Claim 14 wherein the 1-n-butoxy-1-(1-naphthoxy) ethane and the co-antioxidant are present in a mol ratio of from about 1:10 to about 10:1.

16. A synergistic mixture as defined in Claim 14 wherein the 1-n-butoxy-1-(1-naphthoxy) ethane and the co-antioxidant are present in a mol ratio of from about 1:4 to about 4:1.

17. A synergistic mixture as defined in Claim 14 wherein the co-antioxidant comprises t-nonylpolysulfide.

18. A synergistic mixture as defined in Claim 14 wherein the co-antioxidant comprises phenylthiobenzoquinone.

References Cited
UNITED STATES PATENTS

| | | | |
|---|---|---|---|
| 2,526,041 | 10/1950 | Olin | 252—45 |
| 2,738,331 | 3/1956 | Brooks | 252—48.2 |
| 3,328,301 | 6/1967 | Thompson et al. | 252—48.2 X |
| 3,497,181 | 2/1970 | Braid | 252—52 R |

WARREN H. CANNON, Primary Examiner

U.S. Cl. X.R.

44—75, 76; 252—45, 47.5, 52, 404

PO-1050
(5/69)

UNITED STATES PATENT OFFICE
CERTIFICATE OF CORRECTION

Patent No. 3,825,496                     Dated July 23, 1974

Inventor(s) Milton Braid

It is certified that error appears in the above-identified patent and that said Letters Patent are hereby corrected as shown below:

Column 3, line 42, "to-nonylpolysulfide" should read
    --t-nonylpolysulfide--.
Column 3, line 64, "t-noylpolysulfide" should read
    --t-nonylpolysulfide--.
Column 4, line 34, "1-b-butoxy" should read --1-n-butoxy--.

Signed and sealed this 8th day of October 1974.

(SEAL)
Attest:

McCOY M. GIBSON JR.                      C. MARSHALL DANN
Attesting Officer                        Commissioner of Patents